United States Patent [19]

Matsumura et al.

[11] Patent Number: 4,671,236

[45] Date of Patent: Jun. 9, 1987

[54] INTAKE AIR DENSITY COMPENSATION ON THE BASIS OF IGNITION TIMING FOR OPTIMAL DIESEL ENGINE CONTROL

[75] Inventors: Toshimi Matsumura, Aichi; Isao Osuka, Nagoya; Akira Masuda, Aichi, all of Japan

[73] Assignee: Nippondenso Co., Ltd., Kariya, Japan

[21] Appl. No.: 784,311

[22] Filed: Oct. 4, 1985

[30] Foreign Application Priority Data

Oct. 4, 1984 [JP] Japan .................................. 59-208691

[51] Int. Cl.⁴ ............................................. F02M 39/00
[52] U.S. Cl. ..................................... 123/357; 123/494
[58] Field of Search ................ 123/357, 358, 359, 494

[56] References Cited

U.S. PATENT DOCUMENTS

| 4,502,438 | 3/1985 | Yasuhara | 123/357 |
| 4,516,550 | 5/1985 | Buck | 123/357 |
| 4,519,353 | 5/1985 | Ito | 123/359 |
| 4,541,392 | 9/1985 | Ogino | 123/357 |

FOREIGN PATENT DOCUMENTS

58-47130  3/1983  Japan .................................. 123/357

*Primary Examiner*—Carl Stuart Miller
*Attorney, Agent, or Firm*—Cushman, Darby & Cushman

[57] ABSTRACT

In a diesel engine control system, an intake air density compensation system is provided for compensating the control amounts of a diesel engine in accordance with the variations of intake air density. The variation amount of the intake air density is indicated by the difference between the control input amount obtained in accordance with an ignition timing closed loop control and the control amount obtained in accordance with an ignition open loop control. The various control amounts of the diesel engine is compensated on the basis of the difference so that the diesel engine is ensured to be optimally operated irrespective of the variations of intake air density.

6 Claims, 17 Drawing Figures

INTAKE AIR DENSITY COMPENSATION ON THE BASIS OF IGNITION TIMING FOR OPTIMAL DIESEL ENGINE CONTROL

BACKGROUND OF THE INVENTION

The present invention relates generally to an optimal engine control system, and in particular to an intake air density compensation system for optimally controlling a diesel engine by compensating the control amount of the diesel engine in accordance with the variations of intake air density of the diesel engine.

Generally, a diesel engine of a motor vehicle is designed so that the ignition condition of fuel to be supplied thereto is optimized when the motor vehicle is driven at a flatland. Therefore, when driven at a high altitude, it will be required to compensate for the injection fuel amount in connection with a decrease in intake air density in order to prevent the diesel engine from making worse the emission and drivability.

In a prior art technique, various sensors such as an atmospheric pressure sensor and an intake air temperature sensor have been provided in the diesel engine in order to obtain intake air density information. However, this provision results in an increase in the number of parts and production cost, and further difficulty in maintenance and inspection.

One possible solution is to derive the intake air density information as a function of engine operating parameters obtained by various engine operating condition sensors already attached to the diesel engine.

On the other hand, Japanese Patent Provisional Publication No. 58-47130 discloses a feedback control system wherein a fuel injection timing or ignition timing is controlled in accordance with the variations of the pressure in the inside of the cylinder sensed by a pressure sensor attached to a glow plug, or the operation of the fuel injection nozzle detected by an electromagnetic pickup associated with a nozzle valve.

As a result of an examination in terms of ignition timing control paramenters obtained by a technique disclosed in the above-described prior art, it has been found that one or more ignition timing control parameters represent the intake air density information.

SUMMARY OF THE INVENTION

It is accordingly an object of the present invention to provide a new and improved diesel engine control system which overcomes the above-described disadvantages inherent in the prior art control system.

More specifically, in accordance with the present invention, a diesel engine control system with an intake air density compensation system is provided which avoids all of the above-noted problems by employing ignition timing control parameters as intake air density information.

The technique of the present invention involves employing an intake air density compensation system for trimming the control amount of a controlled object, i.e., diesel engine on the basis of ignition timing control parameters indicating the intake air density information so that the diesel engine is ensured to be optimally operated irrespective of driving local conditions, that is, the variations of intake air density.

According to the present invention, the intake air density compensation system comprises an open loop control means and a closed loop control means, the open loop means being arranged to compute a fuel ignition timing in accordance with engine operating conditions and generate an ignition timing control siganl, while the closed loop control means being arranged to calculate a desired fuel ignition timing in accordance with engine operating conditions and generate a control input signal so that an actual ignition timing coincides with the desired ignition timing.

A feature of this invention is to compensate various control amounts of the diesel engine in accordance with the variation amount of intake air density indicated by the difference between the control value from the open loop control means and the control input value from the closed loop control means, and to trim the engine control amount on the basis of the compensation amount thereof.

A further feature of this invention is to compensate various control amounts of the diesel engine in accordance with the variation amount of intake air density indicated by the difference between the ignition timing obtained by the open loop control means and the desired ignition timing calculated by the closed loop control means, and to trim the engine control amount on the basis of the compensation amount thereof, the ignition timing of the open loop control means being obtained by temporarily switching from the closed loop control to the open loop control.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Prior to describing the embodiments of the present invention, a brief description of the basis of this invention will first be made with reference to FIG. 1 for a better understanding of the present invention.

Figure 1:
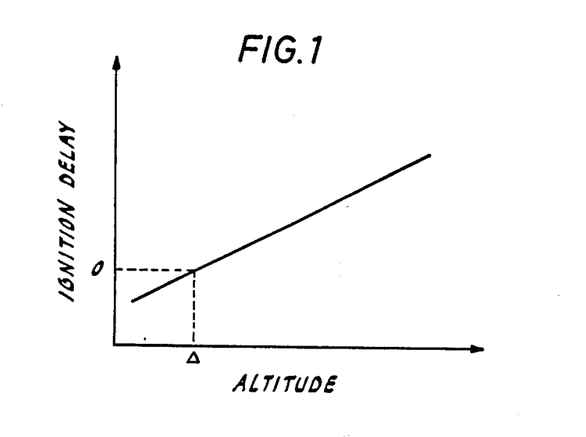
FIG. 1 is a graph showing the delay of ignition timing with respect to intake air density which may be varied depending on the altitude when a vehicle is driving.

FIG. 1 is a graph showing the delay of ignition timing with respect to intake air density which may be varied depending on the altitude of places where a vehicle is being driven. It is indicated in FIG. 1 that the intake air density varies in response to the elevation of the vehicle's driving place and further the delay of ignition timing increases in accordance with the decrease of the intake air density. Therefore, on the basis of this proportional relationship, it is possible to obtain the intake air density information by detecting the degree of the delay of ignition timing, and further this makes it possible to correct each control amount of a diesel engine in accordance with the variations of the intake air density.

Figure 2:
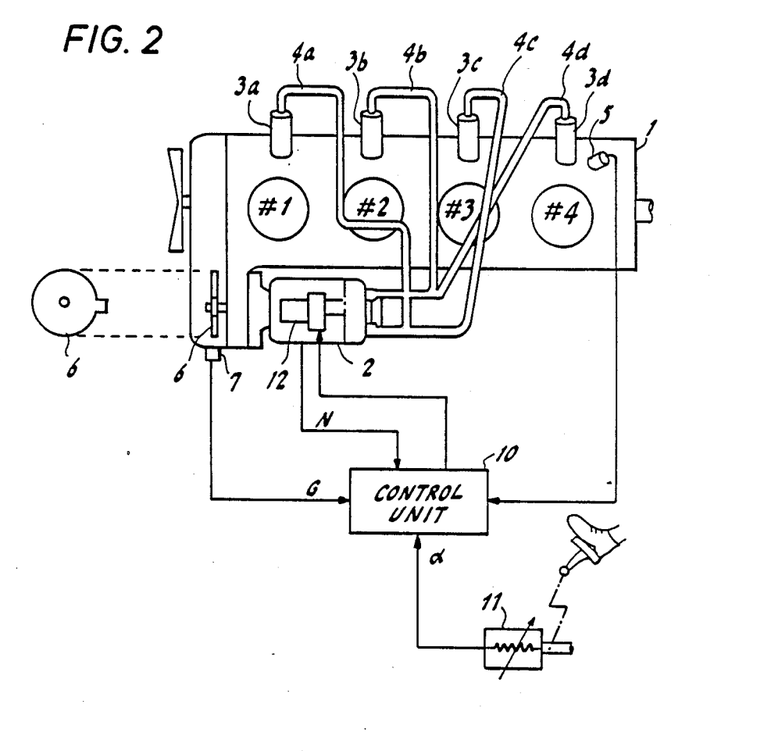
FIG. 2 is a schematic block diagram of an engine control system according to the present invention incorporated with a four-cylinder diesel engine.

Referring now to FIG. 2, there is illustrated a four-cylinder diesel engine associated with an engine control system including an intake air density compensation system according to the present invention.

Figure 3:
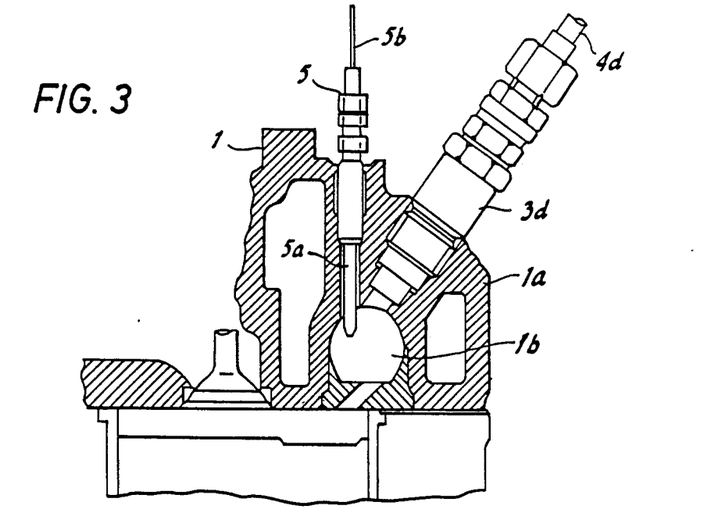
FIG. 3 illustrates an ignition sensor provided in a cylinder head.

The diesel engine 1 is a well known type which is equipped with a fuel injection pump 2 of Bosch VE distribution type including an electronically controlled ignition timing system, a so-called electronic timer. The fuel injection pump 2 is operatively coupled through gears or belts to the diesel engine 1 so as to be rotationally driven at half the engine rotational speed. The fuel injection pump 3 is further coupled through pipes 4a, 4b, 4c and 4d to fuel injection valves 3a, 3b, 3c and 3d attached to each cylinder of the engine 1. Fuel is injected through the pipes 4a, 4b, 4c and 4d and the fuel injection valves 3a, 3b, 3c and 3d into respective combustion chambers or secondary chambers of the cylinders under pressure generated by the operation of the injection pump 2. An ignition sensor 5 is attached to at least one cylinder for the purpose of sensing the actual fuel ignition timing. The ignition sensor 5, as shown in FIG. 3, is fixedly inserted in a hole provided in a cylinder head 1a so that the head portion 5a thereof reaches within a secondary chamber 1b formed in the cylinder head 1a. The head portion 5a is coupled through an optical fiber 5b, for example, to a phototransistor which transduces an optical signal to an electrical signal. With this arrangement, an actual ignition timing is determined in response to the light generated by the combustion of the fuel to be injected into the secondary chamber 1b by means of the fuel injection valve 3d. When the diesel engine 1 is of the type that the secondary chamber 1b is not provided in the cylinder head 1a, the ignition sensor 5 will be arranged so that the head portion thereof directly reaches within the cylinder.

Returning again to FIG. 2, a disc 6 having a protruding portion is coaxially and fixedly mounted on the drive shaft of the injection pump 2 or the engine cam shaft, not shown, which is arranged to rotate at half engine rotational speed. An electromagnetic pickup device 7 is provided at a portion of the engine 1 such that it is temporarily faced to the protruding portion during the revolution so that a pulse signal G is produced whenever the protruding portion passes by the pickup device 7. The disc 6 will be arranged so that the pulse signal G is generated at the time corresponding to a compression top dead center of a predetermined cylinder, for example.

Figure 4:
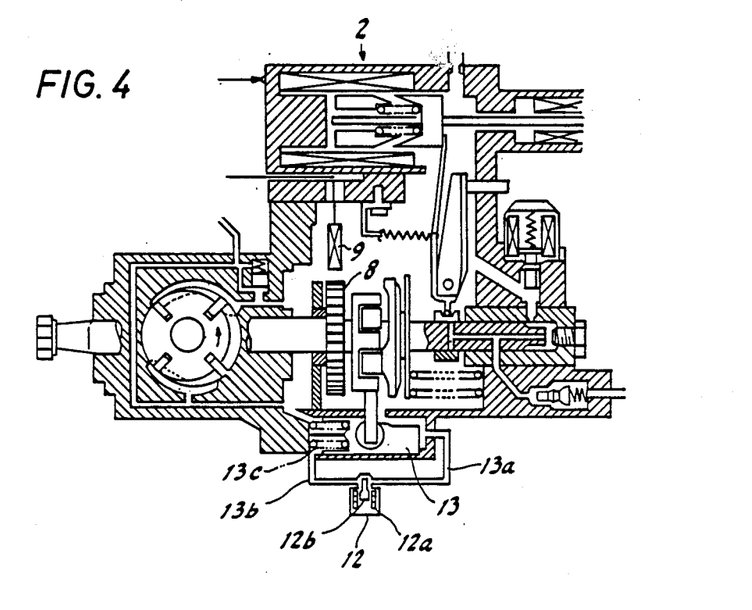
FIG. 4 is a schematic cross-sectional view of a distribution type fuel injection pump.

On the other hand, the injection pump 2, as shown in FIG. 4 which illustrates a schematic cross-section thereof, includes therein a toothed wheel 8 coaxially and fixedly mounted on the drive shaft. The toothed wheel 8 has a plurality of teeth on the circumference thereof and a pulse signal N is produced whenever one of the teeth passes by an electromagnetic pickup device 9 arranged so as to face to the circumference thereof. An engine rotational speed can be derived from the pulse signals G and N, and thus both the pickup devices 7 and 9 function as an engine speed sensor. In the present embodiments, it is assumed that the number of teeth is 16, such that the pulse signal N is generated at intervals of 45° CA (crank angle).

The pulse signals G and N are supplied to a control unit 10 as indicating an engine rotational speed and a specific cam angle. The control unit 10 comprises a microcomputer which is shown in detail in FIG. 5 as including a microprocessor or a central processing unit (CPU), and is powered through an engine starter switch, not shown, from a vehicle-mounted storage battery and is coupled to various engine condition sensors provided in the engine or vehicle, such as a load sensor 11 coupled to an accelerating foot pedal, in order to derive optimum fuel injection timing into each cylinder of the engine under varying engine operating conditions. The control unit 10 is on the other hand coupled to an injection timing control actuator 12, such as a timer control valve (which will be described hereinafter), provided in the fuel injection pump 2 in order to control the fuel injection timing in accordance with the derivation. The load sensor 11 comprises, for example, a potentiometer and is arranged so as to generate a voltage signal proportional to the operating amount of the accelerating foot pedal.

FIG. 4 is a schematic cross-sectional view of the distribution type fuel injection pump 2, and a detailed arrangement thereof will be described with reference to the diagram. However, the injection pump 2 comprises a well known Bosch VE distribution type fuel injection pump and therefore the descritption of its actuation will be partially omitted for brevity.

The injection pump 2 includes a timer piston 13 which functions as a fuel injection timing adjustment member, and is arranged so that the coaxial variations of the timer piston 13 results in the variations of the fuel injection timing. The position of the timer piston 13 is determined by means of the timer control valve 12 controlled in accordance with the instructions from the control unit 10. In response to a control pulse signal from the control unit 10, a coil 12a of the timer control valve 12 sets a valve 12b to the open state for a period of time corresponding to duration of the pulse signal. With the communication between pathways 13a and 13b caused by the opening of the valve 12b, the balancing action of the pressures worked on both ends of the timer piston 13 is effected, causing the timer piston 13 to be transferred in the right direction in the figure by means of a coil spring 13c biasing the same to the right direction therein. Generally, the movement thereof in the right direction results in the retardation of the fuel injection timing.

Accordingly, it will be understood from the above that the fuel injection timing control, i.e., advance or retardation control is performed in accordance with the variations of the duration of the pulse signal fed from the control unit 10 to the timer control valve 12.

Figure 5:
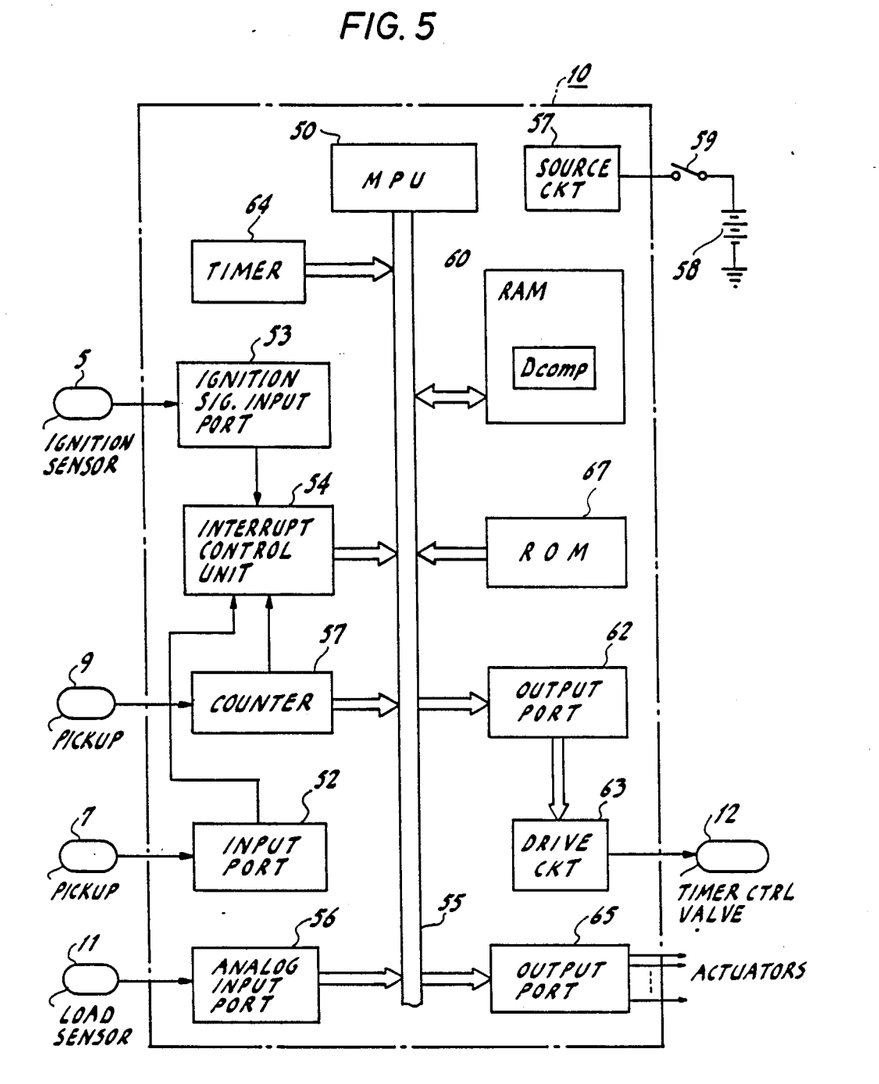
FIG. 5 is a block diagram illustrating the arrangement of the control unit of FIG. 2.

Illustrated in FIG. 5 is a detailed arrangement of the control unit 10 comprising a microcomputer including a microprocessor (MPU) 50 which performs the control of the diesel engine in accordance with programmed instructions. The MPU 50 is coupled through a common bus 55 to its associated units including a random access memory (RAM) 60, a read-only memoty (ROM) 61, input ports 52, 53 and 56, output ports 62 and 65, a counter 51 and an interrupt control unit 54. The counter 51 is responsive to the electromagnetic pickup 9 to obtain the engine speed information by counting the signals N therefrom on the basis of the signal G from the electromagnetic pickup 7 which is coupled to the input port 52. The engine speed counter 51 and G-signal input port 52 enable the interrupt control unit 54 to place an interrupt command signal to the MPU 50 in response to the generation of signal G and after an elapse of 180° crank angle from the generation, i.e., at intervals of 180° crank angle on the basis of the signal G. The input port 53 is responsive to the ignition sensor 5 and further enables the interrupt control unit 54 to place an interrupt command signal to the MPU 50 in response to each signal from the ignition sensor 5 indicating the occurrence of ignition. The analog input port 56 includes an analog-to-digital converter and provides interface between the load sensor 11 indicating the operating amount of the accelerating foot pedal and the MPU 50. The MPU 50 receives the output information of these associated units as various data necessary for processing the programmed instructions through the common bus 55. The microcomputer 10 is powered through a power circuit 57, including a stabilizer circuit, and a key switch 59 from a battery 58. The microcomputer 10 further includes a timer 64 for measuring the passage of time.

The various data is stored in the random access memory 60 which has a storage location for storing correction value data Dcomp used for correcting the duration of the control pulse signal supplied to the timer control valve 12, which will be described hereinafter. The programmed instructions are stored in the read-only memory 61. The output port 62 serves as setting the duration of control pulse signal determined by the MPU 50 as a function of the various data, and the control pulse signal is supplied through a drive circuit 63 to the timer control valve 12 so that the injection timing control is performed in accordance with the movement of the timer piston 12 corresponding to the pulse duration.

The microcomputer 10, as described above, performs the interruption control in response to the interrupt command signal generated in the interrupt control unit 54, and on the other hand, during the absence of the interrupt command signal, performs a closed loop control for controlling the timer piston valve 12 so that an actual ignition timing detected by the ignition sensor 5 coincides with a desired ignition timing derived as a function of the engine operating parameters, or an open loop control for directly controlling the ignition timing on the basis of the detected engine operating conditions.

Also included in the microcomputer 10 is output port 65 which is coupled to various actuators of the diesel engine for outputting various control signals corresponding to various control amounts derived by the MPU as a function of various data.

Figure 6:
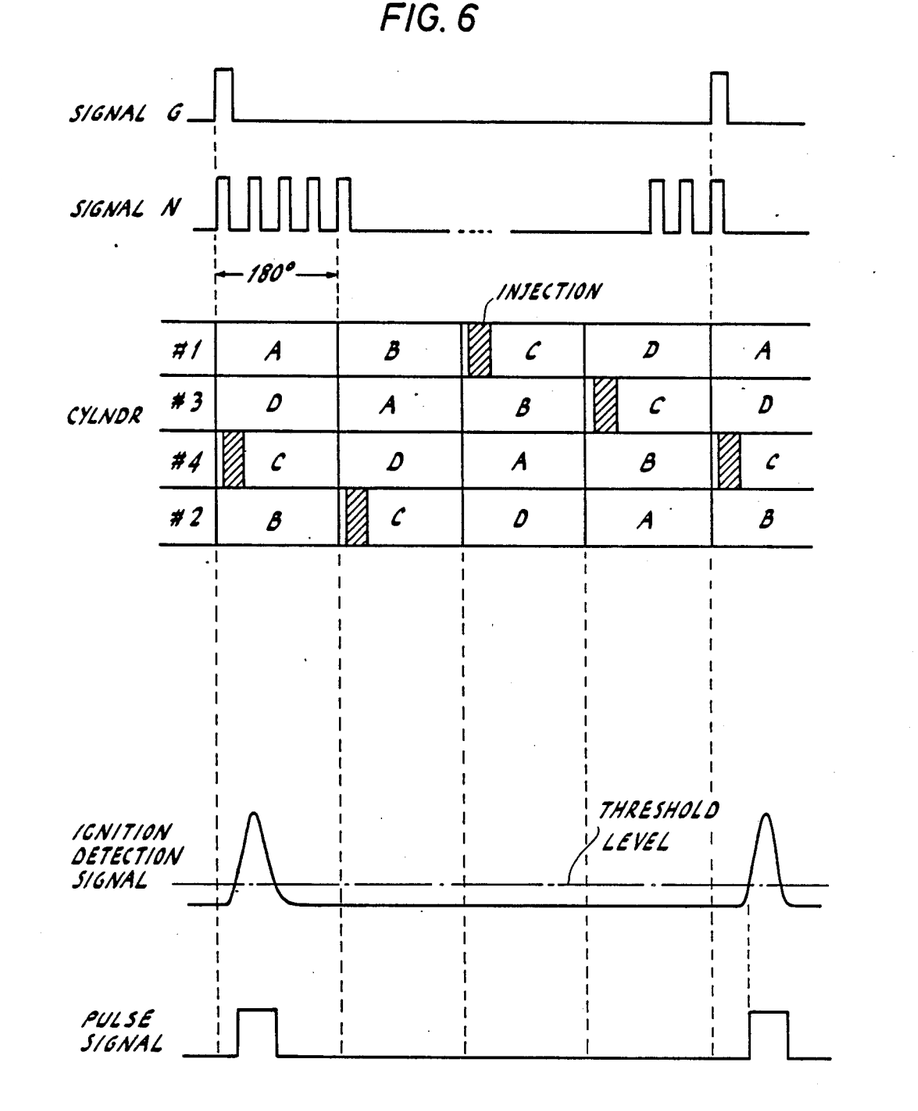
FIG. 6 is a timing chart useful for understanding the generation of signals with respect to the strokes for each cylinder.

FIG. 6 is a timing chart useful for understanding the generations of the above-described signals including the signal G, signal N and ignition signal with respect to the strokes for each cyliner. The reference characters A, B, C and D present respectively intake stroke, compression stroke, power stroke and exhaust stroke. The timing chart shows that the signal N is generated at intervals of 45° crank angle on the basis of the generation of the signal G which is responsive to the compression top dead center of a predetermined cylinder. The ignition detection signal is generated in response to the ignition within the predetermined cylinder and then shaped into a pulse signal by establishing a threshold level. Therefore, the leading edge of the pulse signal indicates the actual ignition timing of the predetermined cylinder.

Figure 7:
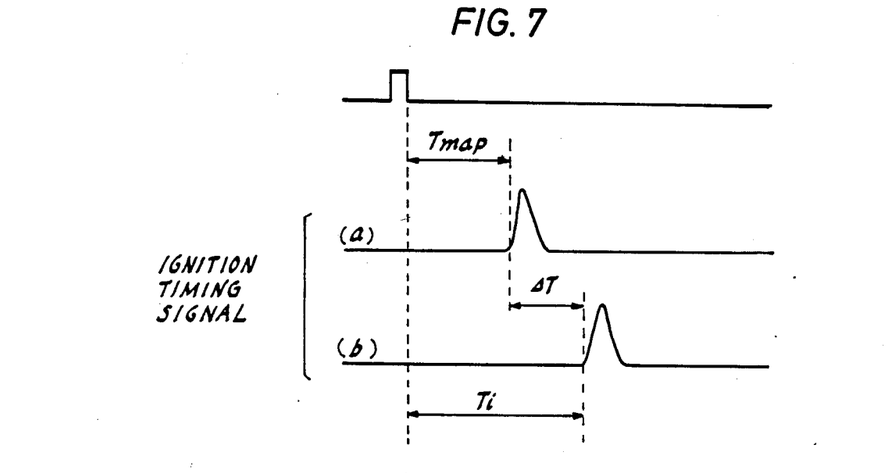
FIG. 7 is a timing chart useful for describing the retardation of ignition timing resulting from the decrease in intake air density.

FIG. 7 is a further timing chart useful for describing the retardation of the ignition timing resulting from the decrease in intake air density. A signal (a) represents a desired ignition timing Tmap on the basis of the signal G and a signal (b) represents an actual ignition timing Ti. It is seen from the timing chart that there is a retardation $\Delta T$ between the desired ignition timing and actual ignition timing. This retardation of the ignition timing $\Delta T$ results from the variation of the intake air density. Therefore, it is possible to obtain actual intake air density information by measuring the retardation $\Delta T$.

However, in practice, the closed loop control is performed in response to the occurrence of the retardation $\Delta T$ so that the actual ignition timing Ti coincides with the desired ignition timing Tmap. This is achieved by controlling so as to decrease the duration of the control pulse signal supplied to the timer control valve 12. Therefore, although it is actually difficult to measure the retardation $\Delta T$, the $\Delta T$ can be indicated by the difference between the control input value of the timer control valve 12 produced in accordance with the closed loop control and the control input value thereof produced in accordance with the open loop control.

Figure 8:
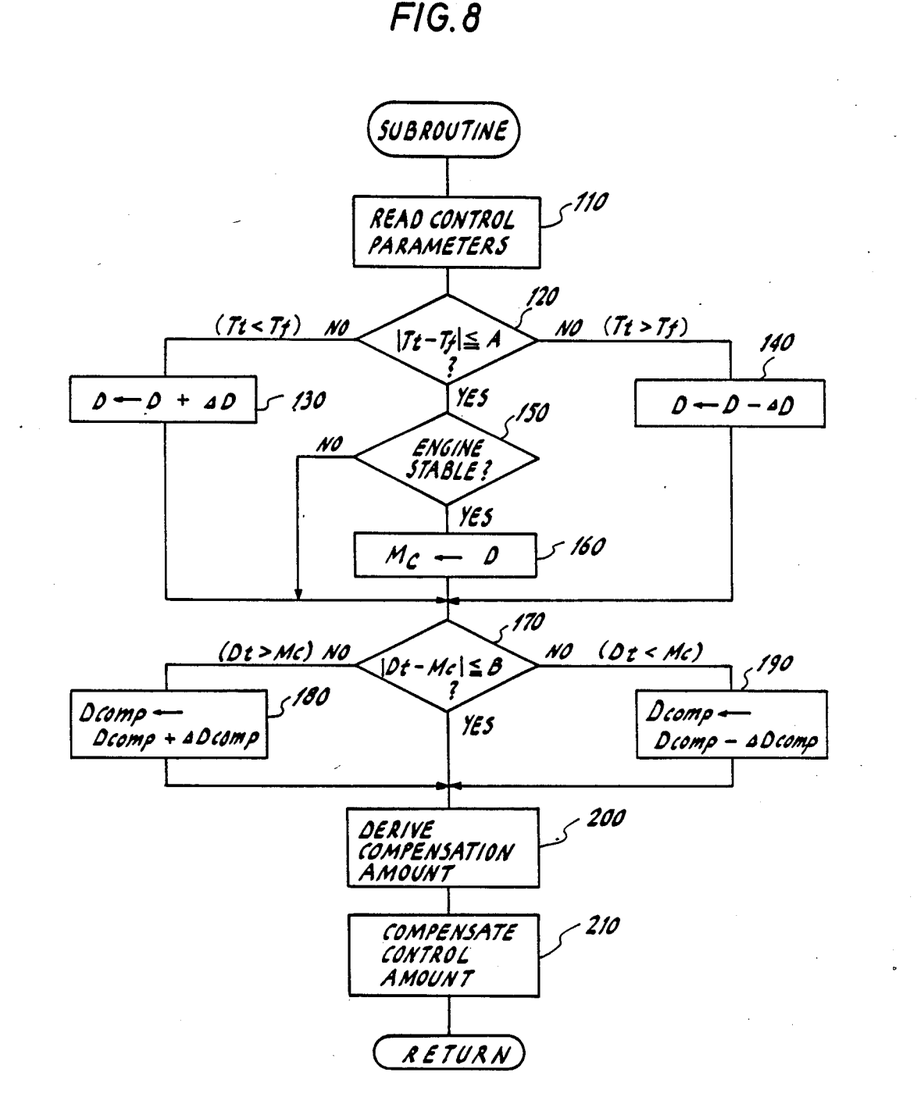
FIG. 8 is a flow chart of the program provided for an engine control system according to the present invention.

Referring to FIG. 8, there is shown a flow chart of an interrupt routine executed in response to an interrupt command signal from the interrupt control unit 54 for the purpose of the correction of the intake air density.

An initial step 110 is provided for obtaining basic control parameters including an actual ignition timing Tf detected by the ignition sensor 5, desired ignition timing Tt derived as a function of engine rotational speed, operating amount of the accelerating pedal and the other engine operating parameters, ignition timing Dt derived in accordance with the open loop control and fuel injection amount, which are in advance read in a main routine or the other subroutines, not shown.

In a subsequent step 120, the MPU compares the difference $|Tt-Tf|$ between a desired ignition timing Tt and an actual ignition timing Tf which are obtained in the previous step 110 with a predetermined value A. Since the difference $|Tt-Tf|$ is generally within $\pm 1°$ CA, the predetermined value A may be set to 1° CA. If $|Tt-Tf| > A$ and $Tt < Tf$, a step 130 is executed to perform an add operation so that a predetermined amount $\Delta D$ is added to a control amount D of the timer control valve 12. On the other hand, when $|Tt-Tf| > A$ and $Tt > Tf$, a step 140 follows to perform subtraction operation so that the predetermined amount $\Delta D$ is subtracted from the control amount D. Therefore, when the actual ignition timing is retarted as compared with the desired ignition timing, the add operation is performed, and when it is advanced as compared with the desired ignition timing, the subtraction operation is performed, thereby resulting in the coincidence between the actual ignition timing and the desired ignition timing. The control amount D represents a control input value obtained in accordance with the closed loop control and further designates a duty of a control pulse signal to be supplied to the timer control valve 12.

When $|Tt-Tf| \leq A$, the step 120 is followed by a step 150 in which the microprocessor checks whether the diesel engine is in the condition that a warming has been completed and is not in a transient condition. The determination of the engine condition may be made by processing the engine operating parameters including coolant temperature and operating amount of the accelerating foot pedal. If the answer in step 150 is NO, control jumps to a step 170, on the other hand, if the answer in step 150 is YES, control goes to the step 170 after a step 160 is executed in which the control amount D is temporarily stored in the RAM 60 as Mc.

The above-described steps are provided for the feedback control of the fuel injection timing, i.e., the timer control valve 12, while the following steps are provided for the purpose of executing the compensation of the control amount on the basis of the variations of intake air density.

In the step 170, the MPU checks whther the difference $|Dt-Mc|$ between the Mc obtained in the previous step 160 and a control amount Dt is less than a predetermined value B. The control amount Dt is derived as a function of engine load, engine speed and the like in accordance with the open loop control when the vehicle is driven on flatland. Generally $|Dt-Mc|$ is about 1.5° CA at the altitude of 1,000 meters above sea level, and thus the predetermined value B may be set to about 1.5° CA. Although the control amount Dt is stored in the ROM 61, the control amount D can be used instead of Dt in this case.

Figure 9:
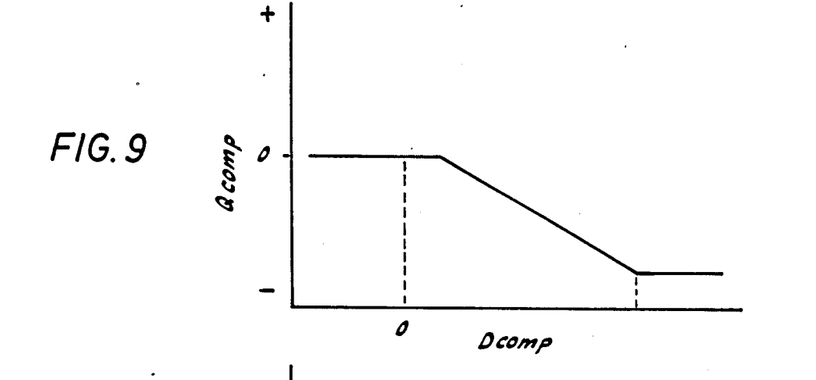
FIGS. 9 to 12 are graphs illustrating the relationship between various compensation amounts for engine control amounts and a basic compensation amount.
Figure 10:
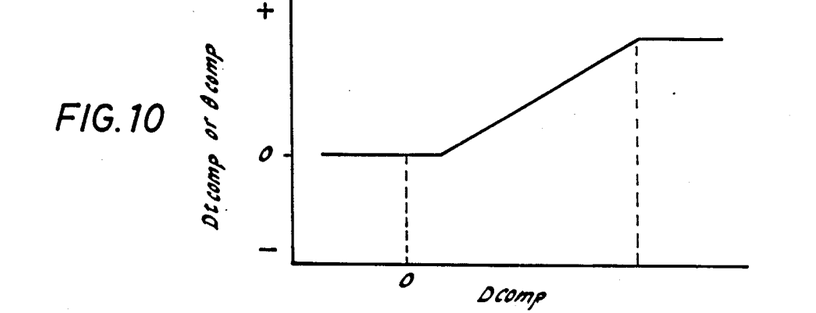
Figure 11:
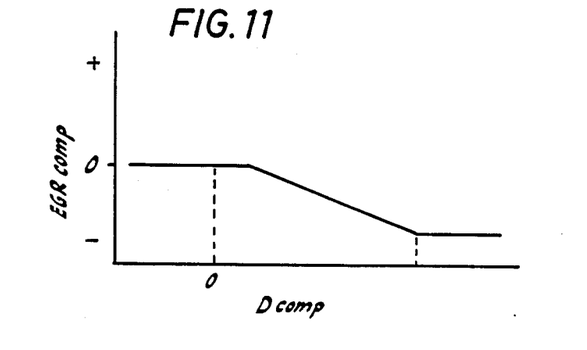
Figure 12:
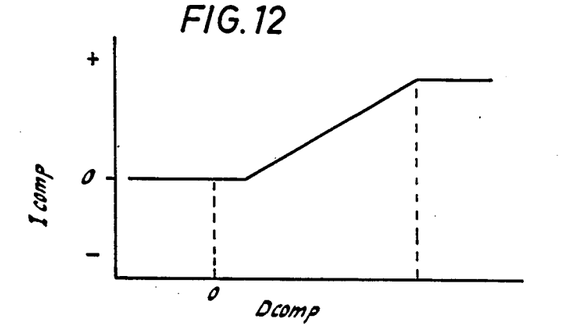

If $|Dt-Mc|>B$ and $Dt>Mc$, a step 180 follows to process for increasing the basic compensation amount Dcomp for all control amounts of the engine by a predetermined amount $\Delta$Dcomp. Furthermore, when $|Dt-Mc|>B$ and $Dt<Mc$, the step 170 is followed by a step 190 in which the compensation amount Dcomp is subtracted by the predetermined amount $\Delta$Dcomp. Therefore, The amount Dcomp represents the compensation amount of feedback control amount required in accordance with the variations of intake air density. It is possible to merely use as Dcomp the difference between Dt and Mc as it is. However, in this embodiment, the add or subtraction operation is executed in order to prevent a decrease in vehicle drivability caused by rapid variations of fuel injection timing and to reduce an undesirable influence for the engine occurred by error operations. After execution of the step 180 or 190, control goes to a step 200. On the other hand, in the step 170, when $|Dt-Mc| \leq B$, that is, the answer is YES, control directly goes to the step 200 in which the compensation amount for various control amounts is derived as a function of Dcomp. For example, when the control amount is the injection fuel amount, an output compensation amount Qcomp is derived as a function of Dcomp from a relationship (graph) as shown in FIG. 9, and similarly, an output compensation amount $\theta$comp of the ignition timing or an output compensation amount Dtcomp of the open control injection timing Dt is derived as a function of Dcomp from a relationship as shown in FIG. 10. Furthermore, an output compensation amount EGRcomp of the emission gas reflux amount and a compensation amount Icomp of the injection fuel amount on the idle running are respectively derived from relationships as shown in FIGS. 11 and 12. These compensation amounts are obtained not only by calculation but also by using maps. A subsequent step 210 is executed to compensate various control amounts in accordance with the compensation amounts obtained in the step 120. This interrupt routine is terminated in response to the completion of the execution of the step 210, and started in response to the next interrupt command signal.

Figure 13:
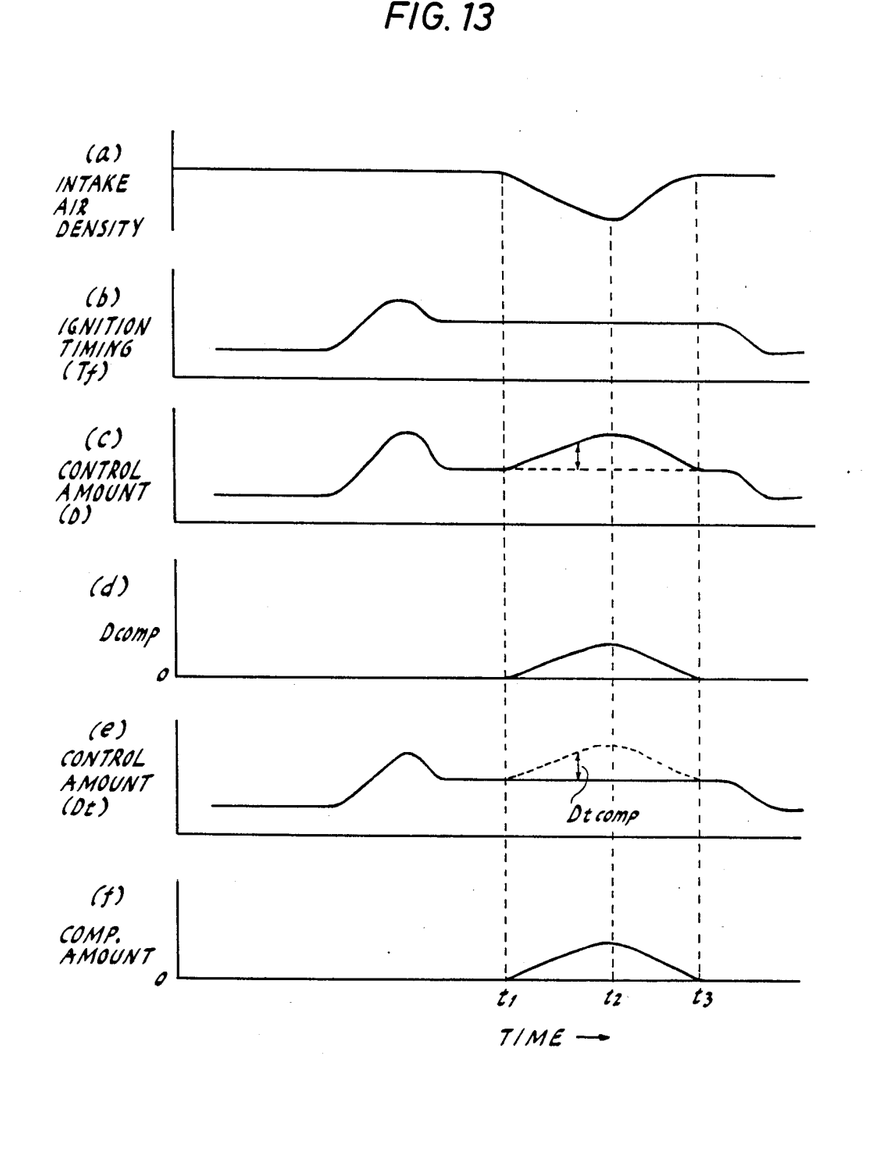
FIG. 13 is a timing chart useful for understanding the first embodiment of the present invention.

The above-described operation will be better understood by a description made with reference to a timing chart of FIG. 13.

In FIG. 13, a curve (a) shows the variations of intake air density caused by the running of the vehicle, a curve (b) representing the variations of desired ignition timing (Tt), a curve (c) designating the variations of control amount of the timer control valve (D), a curve (d) depicting the variations of basic compensation amount (Dcomp), a curve (e) showing the variations of control amount (Dt) obtained in accordance with the open loop control when the vehicle is driven at a flatland, and a curve (f) representing the variations of compensation amount for various control amount.

Prior to a time t1, the vehicle is driven at a flatland and therefore the control amounts such as Tt, D and Dt are respectively derived as a functiuon of engine rotational speed, the variations of engine load and the like. Between time t1 and time t3, the vehicle is driven at an altitude place, resulting in the variations of intake air density. On the other hand, since the engine load, engine speed and the like are not varied, the desired ignition timing Tt is kept at substantially constant value. However, since the actual ignition timing is proportionally retarded in response to the variations of the intake air density, the control amount (D) becomes increased by the amount corresponding to the decreased amount of the intake air density in order to coincide the actual ignition timing with the desired ignition timing, resulting in the occurrence of discrepancy with respect to the amount (dashed line) when the vehicle is driven at a flatland.

On the other hand, when it is assumed that the vehicle is driven at a flatland, the control amount Dt is not increased between time t1 and time t3 as shown by a solid line. However, actually, Dt is compensated in accordance with Dtcomp and therefore is increased as shown by a dashed line. The basic compensation amount Dcomp which is the difference between D and Dt prior to the compensation represents intake air density, and is used for obtaining various compensation amounts for various control amounts in accordance with the variations of intake air density.

It will be seen from the above description that it is possible to obtain intake air information by calculating the delay of ignition timing as a function of the difference between the control amount obtained in accordance with the ignition closed loop control and the control amount obtained in accordance with the open loop control, resulting in an optimal engine control in accordance with the variations of intake air density without using an intake air pressure sensor or intake air temperature sensor.

A further embodiment of the present invention will be described with reference to FIGS. 14 to 17.

Figure 14:
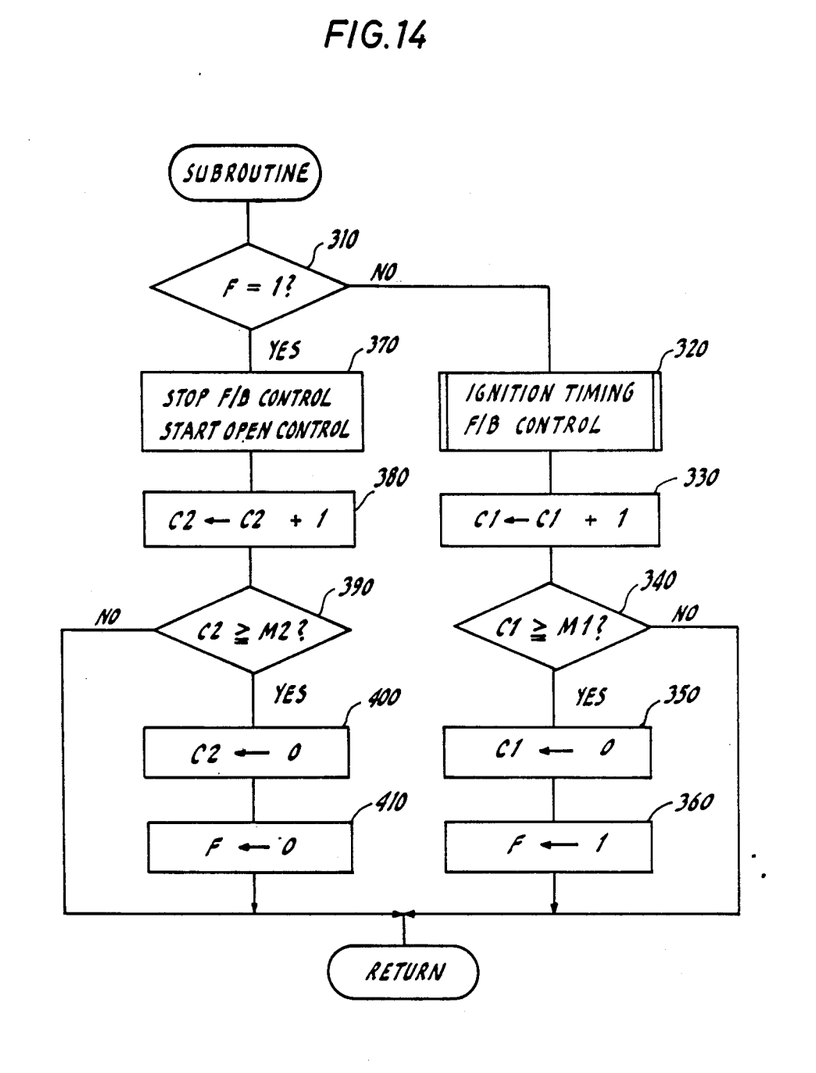
FIG. 14 is a flow chart showing a subroutine performed by the control unit according to the second embodiment of the present invention.

FIG. 14 is a flow chart illustrating an ignition timing control subroutine in which the open loop control is performed in the course of the closed loop control.

Assuming that a flag F is set to "0" when an ignition timing feedback control is being performed, in an initial step 310 which is provided for checking the flag condition, it is determined that the flag F is "0", followed by a step 320. The step 320 corresponds to the steps 110 to 160 of FIG. 8 and an ignition timing feedback control is performed therein. A subsequent step 330 is executed to increment a counter C1 provided in the RAM 60 of the microcomputer 10. This counter C1 is initially set to 0. In a step 340, the microprocessor checks whether the count value of the counter C1 is more than a predetermined value M1. When the count value is less than M1, this routine is terminated. Therefore, while the count value is less than the predetermined value M1, the ignition timing feed back control is continuously performed.

When the count of C1 exceeds the predetermined value M1, the step 340 is followed by a step 350 in which the counter C1 is reset to 0. A step 360 follows to set the flag F to "1".

When this routine is subsequently perfomed, since the flag is set to "1", the step 310 is followed by a step 370. In the step 370, the ignition timing feedback control is stopped and alternatively an open loop control is started. A step 380 follows to increment a counter C2 provided in the RAM 60. Control goes to a subsequent step 390 in which the MPU checks whether the count value of C2 is more than a predetermined value M2. When the count value is less than M2, this routine is terminated. Therefore, while the count of C2 is less than M2, the open loop control is repeated.

As a result of the increment of C2, when C2 became more than M2, the step 390 is followed by a step 400 in which C2 is reset to 0, and subsequently a step 410 is executed to set the flag F to "0".

When this routine is further performed, since flag ="0", the feedback control is again performed. It will be seen from the above description that this routine is executed with alternations of feedback control and open loop control during respectively M1 and M2. Generally, M2 is set to approximately 10% of M1.

Figure 15:
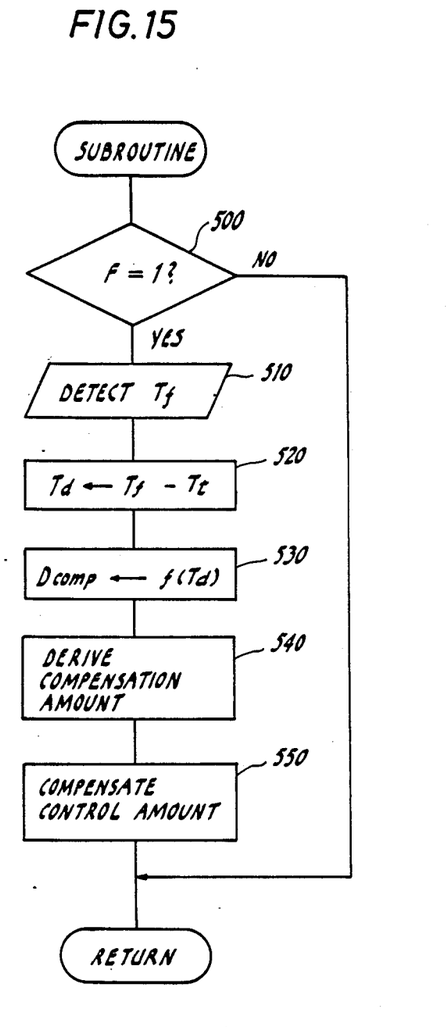
FIG. 15 is a flow chart illustrating a subroutine in conjunction with the subroutine of FIG. 14.

FIG. 15 illustrates a subroutine for intake air density compensation control which is executed when the flag F is "1", that is, the open loop control is performed.

Figure 16:
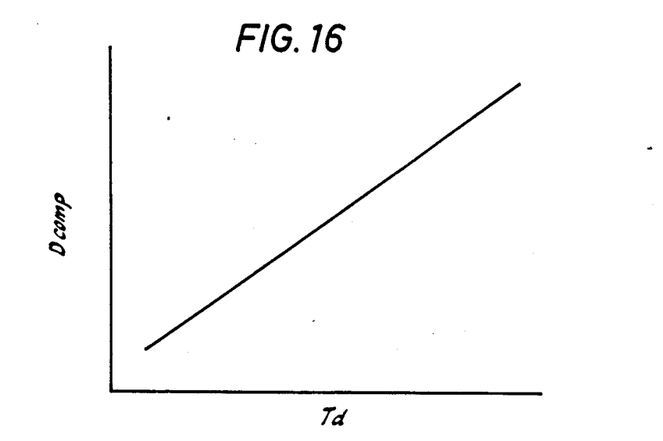
FIG. 16 is a graph showing the difference between an actual ignition timing and a desired ignition timing obtained in accordance with an open loop control with respect to the basic compensation amount.

In a step 500, the MPU checks whether the flag F =1. If not, this subroutine is terminated, on the other hand, if so, a step 510 is executed to detect an actual ignition timing Tf in accordance with a signal from the ignition sensor 5. A step 520 follows to compute the difference Td between Tf obtained in the previous step 510 and a desired ignition timing Tt obtained in accordance with the open loop control. In a subsequent step 530, a basic compensation amount Dcomp is derived as a function of Td obtained in the step 520. The derivation of the amount Dcomp is effected by a calculation or by using a map as shown in FIG. 16.

In a step 540, compensation amounts for various control amounts is obtained on the basis of the amount Dcomp. This step corresponds to the step 200 of FIG. 8. In a subsequent step 550, the various control amounts are compensated in accordance with the compensation amounts obtained in the previous step 540 and set as output control amounts. This step corresponds to the step 210 of FIG. 8.

The above-described operation will be described with reference to FIG. 17 for a better understanding.

Figure 17:
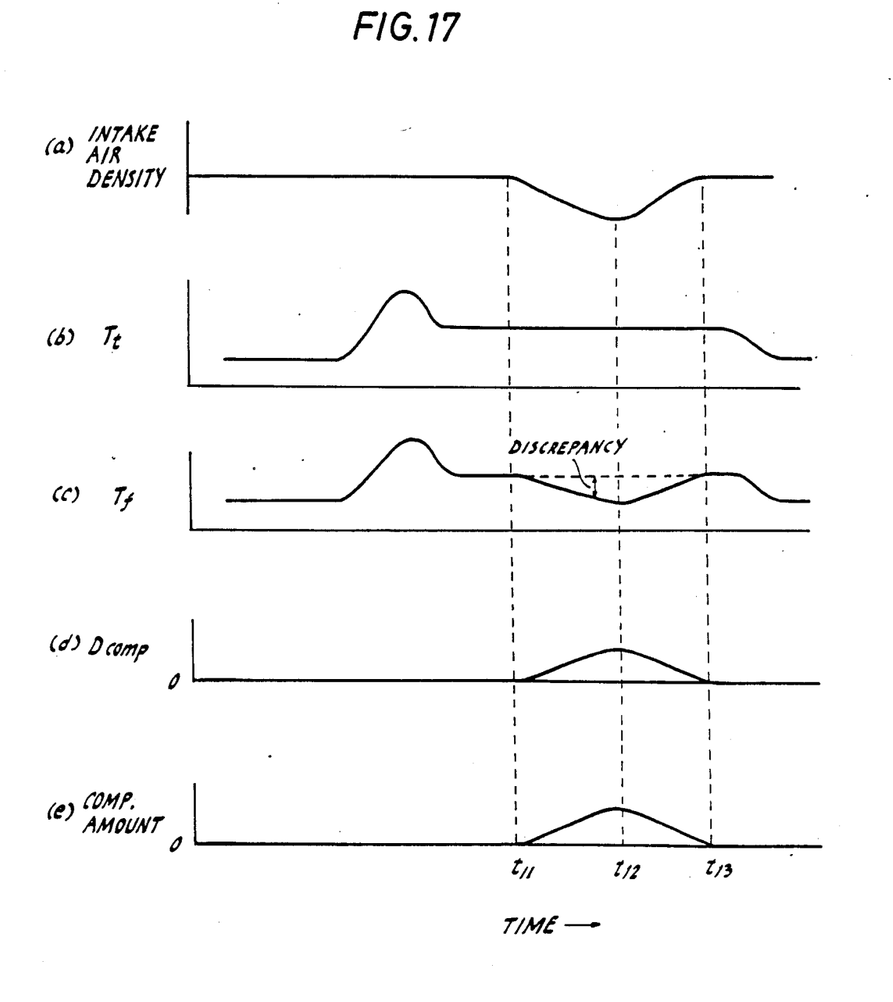
FIG. 17 is a timing chart useful for understanding the second embodiment of the present invention.

In FIG. 17, a curve (a) shows the variations of intake air density caused by the running of the vehicle, a curve (b) representing the variations of desired ignition timing (Tt), a curve (c) designating the variations of ignition timing Tf obtained in accordance with the open loop control, a curve (d) depicting the variations of basic compensation amount (Dcomp), a curve (e) showing the variations of compensation amount for various control amount.

Prior to time t11, the vehicle is driven at a flatland and therefore Tt and Tf are controlled on the basis of the variations of engine load and engine speed. Between time t11 and time t13, the vehicle is driven at an altitude resulting in the variations of intake air density. On the other hand, since the engine load, engine speed and the like are not varied, the desired ignition timing Tt is kept at substantially constant value. However, since the actual ignition timing Tf obtained in accordance with the open loop control is proportionally retarded in response to the variations of the intake air density, a discrepancy occurs between Tf and Tt as seen from the figure. This difference between Tt and Tf corresponds to the basic compensation amount Dcomp and represents intake air density information. Compensation amount for various control amounts (Qcomp, $\theta$comp, Dtcomp, EGRcomp, Icomp) are obtained on the basis of the basic compensation amount Dcomp, resulting in an optimal engine control in accordance with the variations of intake air density.

It should be understood that the foregoing relates to only preferred embodiments of the present invention, and that it is intended to cover all changes and modifications of the embodiments of this invention herein used for the purpose of the disclosure, which do not constitute departures from the spirit and scope of this invention.

What is claimed is:

1. A system for controlling a diesel engine of a motor vehicle in accordance with the variations of intake air density, comprising:
    first sensor means for sensing engine operating conditions in accordance with engine operating parameters including engine rotational speed and engine load;
    second sensor means for sensing an actual ignition timing of fuel to be injected into each cylinder of said engine;
    open loop control means for computing a desired ignition timing on the basis of the engine operating condition sensed by said first sensor and producing a control amount for controlling so as to be ignited at said desired ignition timing;
    closed loop control means for computing a desired ignition timing on the basis of the engine condition sensed by said first sensor means and producing a control amount for controlling so that said desired ignition timing coincides with the actual ignition timing sensed by said second sensor means; and
    compensation means for calculating a difference between said control amount from said closed loop control means and said control amount from said open loop control means and compensating each control amount of said engine on the basis of the calculated difference.

2. A system as claimed in claim 1, wherein said second sensor means is provided in at least one cyliner of said diesel engine and is arranged to detect a light generated by a combustion of fuel injected into said cylinder.

3. A system as claimed in claim 1, wherein said difference calculated by said compensation means is trimmed by a predetermined amount when said difference exceeds a predetermined amount.

4. A system for controlling a diesel engine of a motor vehicle in accordance with the variations of intake air density, comprising:

first sensor means for sensing engine operating conditions in accordance with engine operating parameters including engine rotational speed and engine load;

second sensor means for sensing an actual ignition timing of fuel to be injected into each cylinder of said engine; and a control unit including closed loop control means and open loop control means, said closed loop control means computing a desired ignition timing on the basis of the engine condition sensed by said first sensor means and producing a control amount for controlling so that said desired ignition timing coincides with the actual ignition timing sensed by said second sensor means, and said open loop control means computing a desired ignition timing on the basis of the engine operationg condition sensed by said first sensor and producing a control amount for controlling so as to be ignited at said desired ignition timing, said control unit further including means for:

calculating a difference between said control amount from said closed loop control means and said control amount from said open loop control means; and compensating each control amount of said engine on the basis of the calculated difference.

5. A system for controlling a diesel engine of a motor vehicle in accordance with the variations of intake air density, comprising:

first sensor means for sensing engine operating conditions in accordance with engine operating parameters including engine rotational speed and engine load;

second sensor means for sensing an actual ignition timing of fuel to be injected into each cylinder of said engine;

open loop control means for computing an ignition timing on the basis of the engine operationg condition sensed by said first sensor and producing a control amount for controlling so as to be ignited at said ignition timing;

closed loop control means for computing a desired ignition timing on the basis of the engine condition sensed by said first sensor means and producing a control amount for controlling so that said desired ignition timing coincides with the actual ignition timing sensed by said second sensor means; and control means, operatively connected to said open loop control means and said closed loop control means, for:

switching temporarily to an open loop control performed by said open loop control means in the course of a closed loop control performed by said closed loop control means;

calculating a difference between the desired ignition timing obtained by said closed loop control means and the ignition timing obtained by said open loop control means; and compensating each control amount of said engine on the basis of the calculated difference.

6. A system as claimed in claim 5, wherein said second sensor means is provided in at least one cyliner of said diesel engine and is arranged to detect a light generated by a combustion of fuel injected into said cylinder.

* * * * *